(12) United States Patent
Anderson et al.

(10) Patent No.: US 7,664,983 B2
(45) Date of Patent: Feb. 16, 2010

(54) SYSTEMS AND METHODS FOR EVENT DRIVEN RECOVERY MANAGEMENT

(75) Inventors: Curtis Anderson, Saratoga, CA (US);
John P. Woychowski, Fremont, CA (US); Pratik Wadher, Fremont, CA (US); Balaji Narasimhan, Fremont, CA (US)

(73) Assignee: Symantec Corporation, Cupertino, CA (US)

( * ) Notice: Subject to any disclaimer, the term of this patent is extended or adjusted under 35 U.S.C. 154(b) by 289 days.

(21) Appl. No.: 11/215,958

(22) Filed: Aug. 30, 2005

(65) Prior Publication Data

US 2006/0047997 A1 Mar. 2, 2006

Related U.S. Application Data

(60) Provisional application No. 60/605,168, filed on Aug. 30, 2004.

(51) Int. Cl.
*G06F 11/00* (2006.01)

(52) U.S. Cl. .......................................................... 714/6
(58) Field of Classification Search .................. None
See application file for complete search history.

(56) References Cited

U.S. PATENT DOCUMENTS

| | | | |
|---|---|---|---|
| 4,750,106 A | 6/1988 | Aiken, Jr. | |
| 4,914,568 A | 4/1990 | Kodosky et al. | |
| 4,916,605 A | 4/1990 | Beardsley et al. | |
| 5,089,958 A | 2/1992 | Horton et al. | |
| 5,193,181 A | 3/1993 | Barlow et al. | |
| 5,297,269 A | 3/1994 | Donaldson et al. | |
| 5,301,336 A | 4/1994 | Kodosky et al. | |
| 5,313,612 A | 5/1994 | Satoh et al. | |
| 5,317,733 A | 5/1994 | Murdock | |
| 5,359,724 A | 10/1994 | Earle | |
| 5,404,508 A | 4/1995 | Konrad et al. | |
| 5,446,871 A * | 8/1995 | Shomler et al. | 714/1 |
| 5,448,729 A | 9/1995 | Murdock | |
| 5,504,861 A | 4/1996 | Crockett et al. | |
| 5,537,533 A | 7/1996 | Staheli et al. | |
| 5,604,862 A | 2/1997 | Midgely et al. | |
| 5,610,828 A | 3/1997 | Kodosky et al. | |
| 5,621,882 A | 4/1997 | Kakuta | |
| 5,664,186 A | 9/1997 | Bennett et al. | |
| 5,724,501 A | 3/1998 | Dewey et al. | |
| 5,732,277 A | 3/1998 | Kodosky et al. | |
| 5,745,762 A | 4/1998 | Stiffler | |
| 5,805,785 A | 9/1998 | Dias et al. | |

(Continued)

OTHER PUBLICATIONS

U.S. Appl. No. 11/216,874, Curtis Anderson, Systems and Methods for Rapid Presentation of Historical Views of Stored Data, filed Aug. 30, 2005.

(Continued)

*Primary Examiner*—Michael C Maskulinski
(74) *Attorney, Agent, or Firm*—Hunton & Williams LLP

(57) ABSTRACT

The present invention provides an exemplary system and method for event driven recovery management. One or more data blocks that are generated from a computing device are continually copied. At least one event marker is associated with the copies of the one or more data blocks. Access to the copies of the one or more data blocks according to the at least one event marker is allowed in order to provide event driven recovery.

35 Claims, 5 Drawing Sheets

U.S. PATENT DOCUMENTS

| | | | |
|---|---|---|---|
| 5,875,444 A | 2/1999 | Hughes | |
| 5,875,479 A * | 2/1999 | Blount et al. | 711/162 |
| 5,893,140 A | 4/1999 | Vahalia et al. | |
| 5,930,824 A | 7/1999 | Anglin et al. | |
| 5,974,563 A | 10/1999 | Beeler, Jr. | |
| 5,983,239 A | 11/1999 | Cannon | |
| 6,016,553 A | 1/2000 | Schneider et al. | |
| 6,041,334 A | 3/2000 | Cannon | |
| 6,073,209 A | 6/2000 | Bergsten | |
| 6,085,200 A | 7/2000 | Hill et al. | |
| 6,131,148 A | 10/2000 | West et al. | |
| 6,134,541 A | 10/2000 | Castelli et al. | |
| 6,175,932 B1 | 1/2001 | Foote et al. | |
| 6,192,051 B1 | 2/2001 | Lipman et al. | |
| 6,199,178 B1 | 3/2001 | Schneider et al. | |
| 6,240,527 B1 | 5/2001 | Schneider et al. | |
| 6,269,431 B1 | 7/2001 | Dunham | |
| 6,279,011 B1 | 8/2001 | Muhlestein | |
| 6,324,654 B1 * | 11/2001 | Wahl et al. | 714/6 |
| 6,363,462 B1 | 3/2002 | Bergsten | |
| 6,446,176 B1 | 9/2002 | West et al. | |
| 6,490,691 B1 | 12/2002 | Kimura et al. | |
| 6,522,342 B1 | 2/2003 | Gagnon et al. | |
| 6,532,527 B2 | 3/2003 | Selkirk et al. | |
| 6,542,975 B1 | 4/2003 | Evers et al. | |
| 6,601,062 B1 | 7/2003 | Deshpande et al. | |
| 6,611,923 B1 | 8/2003 | Midgley et al. | |
| 6,647,399 B2 * | 11/2003 | Zaremba | 707/204 |
| 6,654,830 B1 | 11/2003 | Taylor et al. | |
| 6,711,572 B2 | 3/2004 | Zakharov et al. | |
| 6,742,139 B1 | 5/2004 | Forsman et al. | |
| 6,785,786 B1 | 8/2004 | Gold et al. | |
| 6,792,518 B2 | 9/2004 | Armangau et al. | |
| 6,804,714 B1 | 10/2004 | Tummalapalli | |
| 6,845,435 B2 | 1/2005 | Nagasawa et al. | |
| 6,857,012 B2 | 2/2005 | Sim et al. | |
| 6,865,655 B1 | 3/2005 | Andersen | |
| 6,865,676 B1 | 3/2005 | Staring et al. | |
| 6,880,051 B2 | 4/2005 | Timpanaro-Perrotta | |
| 6,883,074 B2 | 4/2005 | Lee et al. | |
| 6,892,204 B2 | 5/2005 | Haas et al. | |
| 6,907,505 B2 | 6/2005 | Cochran et al. | |
| 6,915,340 B2 | 7/2005 | Tanaka | |
| 6,934,822 B2 | 8/2005 | Armangau et al. | |
| 6,941,490 B2 | 9/2005 | Ohran | |
| 6,944,788 B2 | 9/2005 | Dinker et al. | |
| 6,970,939 B2 | 11/2005 | Sim | |
| 6,981,177 B2 * | 12/2005 | Beattie | 714/20 |
| 7,047,287 B2 | 5/2006 | Sim et al. | |
| 7,058,014 B2 | 6/2006 | Sim | |
| 7,065,522 B2 | 6/2006 | Taylor et al. | |
| 7,107,486 B2 | 9/2006 | Okada et al. | |
| 7,163,273 B2 | 1/2007 | Silverbrook | |
| 7,165,095 B2 | 1/2007 | Sim | |
| 7,165,154 B2 | 1/2007 | Coombs et al. | |
| 7,171,469 B2 | 1/2007 | Ackaouy et al. | |
| 7,177,270 B2 | 2/2007 | Sim et al. | |
| 7,181,523 B2 | 2/2007 | Sim | |
| 7,185,029 B1 | 2/2007 | Titus et al. | |
| 7,249,118 B2 | 7/2007 | Sandler et al. | |
| 7,251,749 B1 * | 7/2007 | Fong et al. | 714/20 |
| 7,284,030 B2 | 10/2007 | Ackaouy et al. | |
| 7,296,008 B2 | 11/2007 | Passerini et al. | |
| 7,360,113 B2 | 4/2008 | Anderson | |
| 7,363,316 B2 | 4/2008 | Anderson | |
| 7,421,617 B2 | 9/2008 | Anderson | |
| 7,577,807 B2 | 8/2009 | Rowan et al. | |
| 2002/0038296 A1 | 3/2002 | Margolus et al. | |
| 2002/0049883 A1 | 4/2002 | Schneider et al. | |
| 2002/0078174 A1 | 6/2002 | Sim et al. | |
| 2002/0083118 A1 | 6/2002 | Sim | |
| 2002/0083187 A1 | 6/2002 | Sim et al. | |
| 2002/0112069 A1 | 8/2002 | Sim | |
| 2002/0120824 A1 | 8/2002 | Hooper, III | |
| 2002/0124013 A1 | 9/2002 | Loy et al. | |
| 2003/0009552 A1 | 1/2003 | Benfield et al. | |
| 2003/0026254 A1 | 2/2003 | Sim | |
| 2003/0031176 A1 | 2/2003 | Sim | |
| 2003/0046369 A1 | 3/2003 | Sim et al. | |
| 2003/0051111 A1 | 3/2003 | Nakano et al. | |
| 2003/0078987 A1 | 4/2003 | Serebrennikov | |
| 2003/0093579 A1 | 5/2003 | Zimmer et al. | |
| 2004/0031030 A1 | 2/2004 | Kidder et al. | |
| 2004/0054748 A1 | 3/2004 | Ackaouy et al. | |
| 2004/0054777 A1 | 3/2004 | Ackaouy et al. | |
| 2004/0064463 A1 | 4/2004 | Rao et al. | |
| 2004/0088508 A1 | 5/2004 | Ballard et al. | |
| 2004/0139098 A1 | 7/2004 | Margolus et al. | |
| 2004/0139128 A1 | 7/2004 | Becker et al. | |
| 2004/0143578 A1 | 7/2004 | Margolus et al. | |
| 2004/0153717 A1 | 8/2004 | Duncan | |
| 2004/0162808 A1 | 8/2004 | Margolus et al. | |
| 2004/0220961 A1 | 11/2004 | Lee et al. | |
| 2004/0260873 A1 | 12/2004 | Watanabe | |
| 2005/0010835 A1 * | 1/2005 | Childs et al. | 714/6 |
| 2005/0050386 A1 | 3/2005 | Reinhardt et al. | |
| 2005/0066118 A1 | 3/2005 | Perry et al. | |
| 2005/0066225 A1 | 3/2005 | Rowan et al. | |
| 2005/0076262 A1 | 4/2005 | Rowan et al. | |
| 2005/0076264 A1 | 4/2005 | Rowan et al. | |
| 2005/0081091 A1 | 4/2005 | Bartfai et al. | |
| 2005/0097128 A1 | 5/2005 | Ryan et al. | |
| 2005/0108268 A1 | 5/2005 | Saintry et al. | |
| 2005/0114367 A1 | 5/2005 | Serebrennikov | |
| 2005/0120058 A1 | 6/2005 | Nishio | |
| 2005/0131961 A1 | 6/2005 | Margolus et al. | |
| 2005/0132249 A1 | 6/2005 | Burton et al. | |
| 2005/0138090 A1 | 6/2005 | Augenstein et al. | |
| 2005/0138160 A1 | 6/2005 | Klein et al. | |
| 2005/0203930 A1 | 9/2005 | Bukowski et al. | |
| 2005/0240792 A1 | 10/2005 | Sicola et al. | |
| 2005/0246367 A1 | 11/2005 | Edwards et al. | |
| 2005/0251540 A1 | 11/2005 | Sim-Tang | |
| 2005/0257085 A1 | 11/2005 | Haustein et al. | |
| 2005/0262097 A1 | 11/2005 | Sim-Tang et al. | |
| 2005/0262377 A1 | 11/2005 | Sim-Tang | |
| 2006/0218434 A1 * | 9/2006 | Solhjell | 714/6 |
| 2006/0277431 A1 | 12/2006 | Hsu | |
| 2007/0006018 A1 | 1/2007 | Thompson et al. | |

OTHER PUBLICATIONS

U.S. Appl. No. 11/166,690, Curtis Anderson, Systems and Methods for Organizing and Mapping Data, filed Jun. 23, 2005.

U.S. Appl. No. 11/215,930, Curtis Anderson, Systems and Methods for Optimizing Restoration of Stored Data, filed Aug. 30, 2005.

U.S. Appl. No. 11/216,439, Curtis Anderson, Protocol for Communicating Data Block Copies in an Error Recovery Environment, filed Aug. 30, 2005.

Neel, D., "Symantec Says It'll Put Data on Road to Recovery—New LiveState Line Promises Complete System Restoration," Computer Reseller News, Oct. 4, 2004, 12.

Kador, J., "Open Middleware: The Next Generation in Distributed Computing," Midrange Systems, Nov. 25, 1994, v.7, n.22, p. S12(4).

Alexander et al., "Corporate Business Servers: An Alternative to Mainframes for Business Computing", Hewlett-Packard Journal, vol. 45, No. 3, pp. 8-30, Jun. 1994.

Bodorik et al., Recoverable Virtual Memory through the Multi-View Memory Computer System, System Science 1999, Proceeding of the $32^{nd}$ Annual International Conference, vol. 3, 10 pp., Dec. 5-9, 1999.

Borg et al., "Fault Tolerance Under Unix", Communications of the ACM, vol. 32, No. 5, pp. 625-628, May 1989.

Chaudhuri, S. and Dayal, U. 1997. An overview of data warehousing arid OLAP technology SIGMOD Ree. 26, 1 (Mar. 1997), pp. 65-74. DOI = http://doi.aem.orgf10.11451248603.248616.

Colliat, G: 1996. OLAP, Relational, and Multidimensional Database Systems. SIGMOND Rec. 25, 3 (Sep. 1996), pp. 64-69, DOI= http://doLacm.org/10.1145/234889.234901.

Guo et al., "A System Framework and Key Techniques of Fragments Assembly for Restoration of Historical Relics Based on Grid, Virtual Realit Continuum and its Application", Proceedings of the 2006 ACM International Conference on Virtual Reality Continuum and its Applications, pp. 387-390 (2006).

Gursahani, A. Materialized Views in Oracle. (Apr. 18, 2003) Available online at: http://www.databaSejournal.comlfealures/oracle/article.php /2192071.

Materialized Views, Oracle9i Data Warehousing Guide, Release 2 (9.2), Part No. A96520-01, Copyright © 1996.

Satyanarayanan, "the Evoulution of Coda", ACM Transactions on Computer Systems, 20, 2, 85, (40), May 2002.

Shimberg, D., "Following a Client / Server Database Methodology," DMBS, vol. 8, No. 5, p. 48, May 1995.

Triggers, Oracle9i Database Concepts, Release 2, (9.2), Part No. A96524-01, Copyright © 1996.

* cited by examiner

SYSTEMS AND METHODS FOR EVENT DRIVEN RECOVERY MANAGEMENT

CROSS-REFERENCE TO RELATED APPLICATIONS

The present application claims the benefit and priority of U.S. provisional patent application Ser. No. 60/605,168 filed on Aug. 30, 2004 and entitled "Image Manipulation of Data," which is herein incorporated by reference.

The present application is related to co-pending U.S. application Ser. No. 11/166,690, entitled "Systems and Methods for Organizing and Mapping Data," filed on Jun. 23, 2005, co-pending U.S. application Ser. No. 11/215,930, "Systems and Methods for Optimizing Restoration of Stored Data", filed on Aug. 30, 2005, co-pending U.S. application Ser. No. 11/216,874, entitled "Systems and Methods for Rapid Presentation of Historical Views for Stored Data", filed on Aug. 30, 2005, and co-pending U.S. application co-pending U.S. application Ser. No. 11/216,439, entitled "Protocol for Communicating Data Block Copies in an Error Recovery Environment", filed Aug. 30, 2005, which are herein incorporated by reference.

BACKGROUND OF THE INVENTION

1. Field of the Invention

The present invention relates generally to data recovery, and more particularly to systems and methods for event driven recovery management.

2. Description of Related Art

Conventionally, recovery management has been overseen by various systems that keep track of data being written to a storage medium. Recovery management may be necessary to recover data that has been damaged by a disk crash, a virus, erroneous deletions, overwrites, or other various user and logical errors. Numerous other reasons are cited by companies and individuals for requiring access to data as it existed at one point in time.

Back-up methods for storing data are necessary before the data can be recovered. Back-up methods may include copying files or databases so that they will be preserved in case of equipment failure or other catastrophe. Some processes may involve copying backup files to a hard disk from backup media in order to return data to its original condition. Other techniques may include periodically copying contents of all or a designated portion of data from the data's usual storage device to a cartridge device so the data will not be lost in the event of a hard disk crash.

Backup procedures, such as those described above, require a great deal of processing power from a server performing the backups of the data. For this reason, backup procedures may be offloaded from a server so that the time ordinarily devoted to backup functions can be used to carry out other server tasks. For example, in some environments, an intelligent agent may be utilized to offload the backup procedures. The intelligent agent may take a "snapshot" of a computer's data at a specific time so that if future changes cause a problem, the system and data may be restored to the way they were at the time of the "snapshot." The snapshot may consist of an image of pointers that indicate a location of data being backed up.

Continuous backup systems may utilize snapshots. These continuous backup systems typically back up all data whenever a change is made. Thus, one storage snapshot may be made for every instance data is modified.

Once copies of the data have been made in some manner, data recovery may be employed to retrieve the copies of the data. Data recovery seeks to return the data to a state where it existed before certain changes were made to the data. The data may be recovered to different points in time, depending upon the state of the data a user wants to access.

Data recovery methods often require a user to know to what point in time the data is to be recovered. A tape, disk, or other back up medium can then be searched in order to recover the data as it existed at that particular point in time. Unfortunately, the user may not comprehend the best point in time to which to recover the data.

Therefore, there is a need for a system and method for event driven recovery management.

SUMMARY OF THE INVENTION

The present invention provides an exemplary system and method for event driven recovery management. One or more data blocks that are generated from a computing device are continually copied. At least one event marker is associated with the copies of the one or more data blocks. Access to the copies of the one or more data blocks according to the at least one event marker is allowed in order to provide event driven recovery.

DESCRIPTION OF EXEMPLARY EMBODIMENTS

Figure 1:
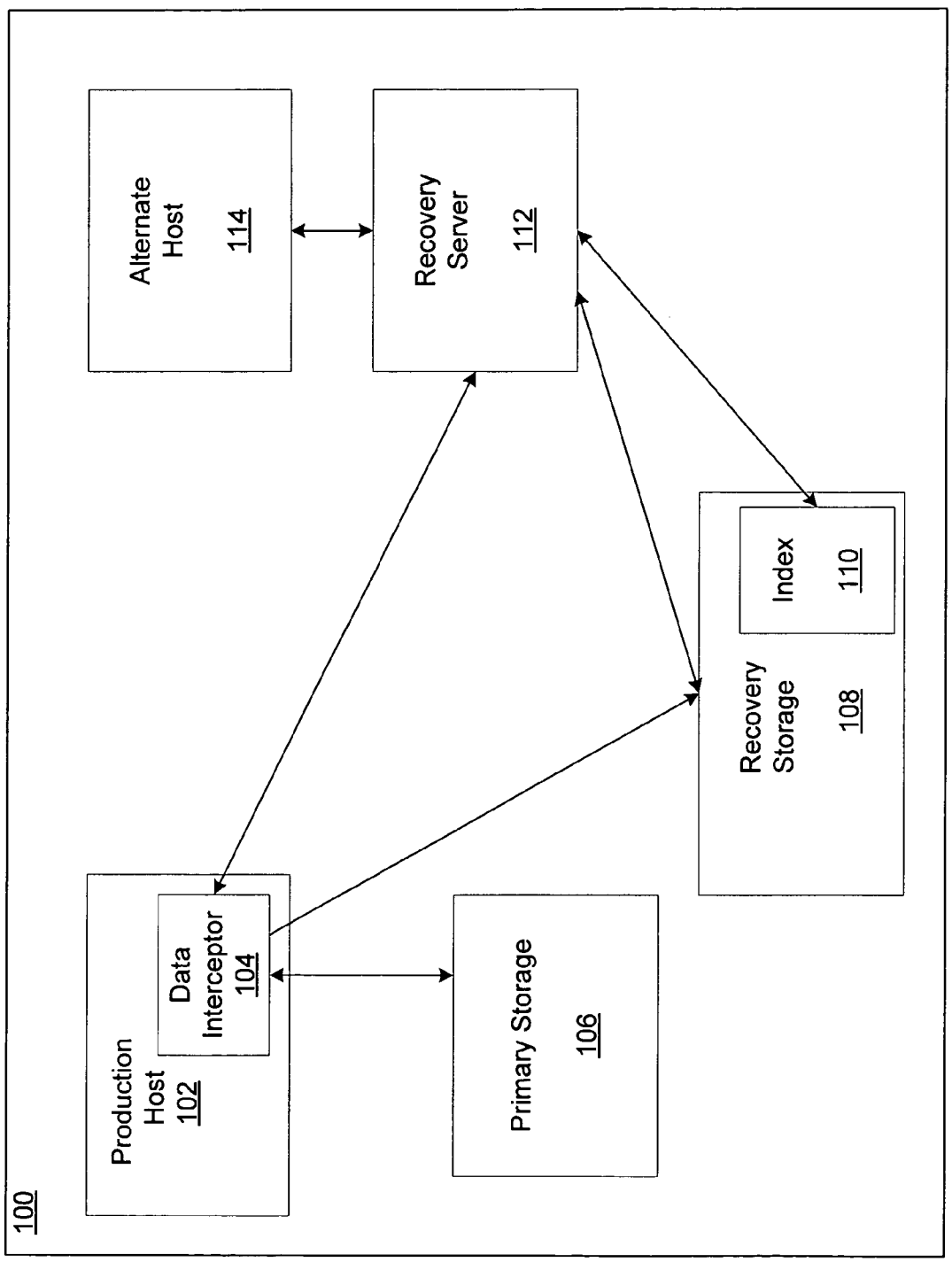
FIG. 1 shows an exemplary schematic diagram for an event driven recovery management environment in accordance with one embodiment.

FIG. 1 is a schematic diagram of an environment for organizing and mapping data in accordance with exemplary embodiments. Fibre Channel (FC) may be utilized to transmit data between the components shown in FIG. 1. However, any type of system (e.g., optical system), in conjunction with FC or alone, may be utilized for transmitting the data between the components.

The exemplary environment 100 comprises a production host 102 for creating various types of data. For example, a financial software program running on the production host 102 can generate checkbook balancing data. Any type of data may be generated by the production host 102. Further, the production host 102 may include any type of computing device, such as a desktop computer, a laptop, a server, a personal digital assistant (PDA), and a cellular telephone. In a further embodiment, a plurality of production hosts 102 may be provided.

The production host 102 may include a data interceptor 104. For example, a data tap that captures and duplicates data blocks or any other type of data may comprise the data interceptor 104 according to some embodiments. The data interceptor 104 may be any hardware, software, or firmware that resides on the production host 102, or otherwise accesses the data generated by the production host 102. For example, the data interceptor 104 may be embedded in a SAN switch or a disk array controller. According to exemplary embodiments, the data interceptor 104 may be coupled to, or reside on, one or more production hosts 102. Conversely, in some embodiments, the production host 102 may include or be coupled to more than one data interceptor 104.

The data interceptor 104 copies data created by the production host 102 and stores the data ("data blocks") in a primary storage 106 associated with the production host 102. The copies of the data blocks ("data block copies") are stored to recovery storage 108. The recovery storage 108 may comprise any type of storage, such as time addressable block storage ("TABS"). Although "data blocks" and "data block copies" is utilized to describe the data created and the copies of the data generated, files, file segments, data strings and any other data may be created and copies generated according to various embodiments. Further, the data blocks and the data block copies may be a fixed size or varying sizes.

The primary storage 106 and/or the recovery storage 108 may include random access memory (RAM), hard drive memory, a combination of static and dynamic memories, or any other memory resident on the production host 102 or coupled to the production host 102. The primary storage 106 may include any storage medium coupled to the production host 102 or residing on the production host 102. In one embodiment, the data interceptor 104 may store the data blocks to more than one of the primary storage 106.

According to one embodiment, the data interceptor 104 can create data block copies from the data blocks after the production host 102 stores the data blocks to the primary storage 106 or as the data blocks are generated by the production host 102.

Data blocks are typically created from the production host 102 each instant a change to existing data at the primary storage 106 is made. Accordingly, a data block copy may be generated each time the data block is generated, according to exemplary embodiments. In another embodiment, the data block copy may comprise more than one data block. Each data block copy and/or data block may reflect a change in the overall data comprised of the various data blocks in the primary storage 106.

In exemplary embodiments, the data interceptor 104 intercepts each of the data blocks generated by the production host 102 in order to create the data block copies. The data block is sent to the primary storage 106 by the data interceptor 104, while the data interceptor 104 sends the data block copy to the recovery storage 108, as discussed herein. The data block copies may be combined to present a view of data at a recovery point (i.e., as the data existed at a point in time), called a "historical view." In other words, the data block copies may be utilized to re-create the data (i.e., the data blocks stored in the primary storage 106) as it existed at a particular point in time. The "historical view" of the data may be provided to a user requesting the data as a "snapshot" of the data. The snapshot may comprise an image of the data block copies utilized to create the historical view, according to one embodiment.

In an alternative embodiment, the data interceptor 104, or any other device, may compare the data blocks being generated with the data blocks already stored in the primary storage 106 to determine whether changes have occurred. The copies of the data blocks may then be generated when changes are detected.

The historical view may also be used to present an image of all of the data in the primary storage 106 utilizing some of the data block copies in the recovery storage 108 and some of the data blocks in the primary storage 106. In other words, the historical view at time x may be recreated utilizing some of the data blocks from the primary storage 106 and some of the data block copies from the recovery storage 108, rather than only the data block copies from the recovery storage 108. Thus, the data block copies from the recovery storage 108 may be combined with the data blocks from the primary storage 106 in order to create the historical view.

In one embodiment, the production host 102 reserves private storage or temporary storage space for the data interceptor 104. The private storage space may be utilized by the data interceptor 104 for recording notes related to the data blocks, for temporarily storing the data block copies, or for any other purpose. For instance, if the recovery server 112 is not available to instruct the data interceptor 104 where to store the data block copies in the recovery storage 108, the temporary storage may be utilized to store the data block copies until the recovery server 112 is available.

Similarly, the temporary storage may be utilized to store the data block copies if the recovery storage 108 is unavailable. Once the recovery server 112 and/or the recovery storage 108 is once again available, the data block copies may then be moved from the temporary storage to the recovery storage 108 or any other storage.

In another embodiment, the data interceptor 104, using a bit map or any other method, tracks the data blocks from the production host 102 that change. Accordingly, if the recovery server 112 and/or the recovery storage 108 is unavailable, the data interceptor 104 records which data blocks on the primary storage 106 change. The data interceptor 104 can copy only the data blocks from the primary storage 106 to the recovery storage 108 that changed while the recovery server 112 and/or the recovery storage 108 were unavailable. Specifically, the data interceptor 104 or any other device flags each data block generated by the production host 102 that changes. The flags are referenced when the recovery server 112 and/or the recovery storage 108 are available to determine which data blocks were changed during the time the recovery server 112 and/or the recovery storage 108 were unavailable. Although each data block may change more than one time, each of the data blocks reflecting the most recent change to the data blocks when the recovery server 112 and/or the recovery storage 108 become available are the data blocks that are copied to the recovery storage 108 from the primary storage 106.

In yet another embodiment, the data interceptor 104 may continue to store the data block copies to an area of the recovery storage 108 allocated for data block copies from the data interceptor 104 by the recovery server 112 prior to the recovery server 112 becoming unavailable. In other words, if the recovery server 112 is unavailable, but the recovery server 112 has previously instructed the data interceptor 104 to store the data block copies to a specified area of the recovery storage 108, the data interceptor 104 can continue to store the data block copies to the specified area until the specified area is full and/or the recovery server 112 becomes available.

In still a further embodiment, a backup recovery server may be provided to provide the recovery server 112 functions if the recovery server 112 is unavailable. As discussed herein, more than one recovery server 112 may be provided. Similarly, more than one production host 102 may be provided, as a set of computing devices or other configuration, with other production hosts 102 in the set capable of performing functions associated with the production host 102 in the event the production host 102 becomes unavailable. The process of restoring data is described in further detail in co-pending U.S. application Ser. No. 11/215,930, entitled "Systems and Methods of Optimizing Restoration of Stored Data," filed on Aug. 30, 2005.

The exemplary data interceptor 104 also creates metadata in one or more "envelopes" to describe the data block copies and/or the data blocks. The envelopes may include any type of metadata. In exemplary embodiments, the envelopes include metadata describing the location of the data block in the primary storage 106 (i.e., a logical block address "LBA"), the size of the data block and/or the data block copies, the location of the data block copy in the recovery storage 108, or any other information related to the data. In exemplary embodiments, the envelopes associated with the data block copies preserve the order in which the data blocks are created by including information about the order of data block creation by the production host 102. The protocol for communicating data block copies is described in further detail in co-pending U.S. application Ser. No. 11/216,439, entitled "Protocol for Communicating Data Block Copies in an Error Recovery Environment," filed on Aug. 30, 2005.

The data interceptor 104 forwards the envelopes to a recovery server 112. The data interceptor 104 may associate one or more unique identifiers, such as a snapshot identifier ("SSID"), with the data block copies to include with one or more of the envelopes. Alternatively, any device can associate the unique identifiers with the one or more envelopes, including the data interceptor 104. The recovery server 112 may also designate areas of the recovery storage 108 for storing one or more of the data block copies in the recovery storage 108 associated with the one or more envelopes. When the data interceptor 104 stores the data block copies to the recovery storage 108, the data interceptor 104 can specify in the associated envelopes where the data block copy was stored in the recovery storage 108. Alternatively, any device can designate the physical address for storing the data block copies in the recovery storage 108.

The unique identifiers may be assigned to single data block copies or to a grouping of data block copies. For example, the recovery server 112 or other device can assign the identifier to each data block copy after the data block copy is created by the data interceptor 104, or the unique identifier may be assigned to a group of the data block copies.

Figure 3:
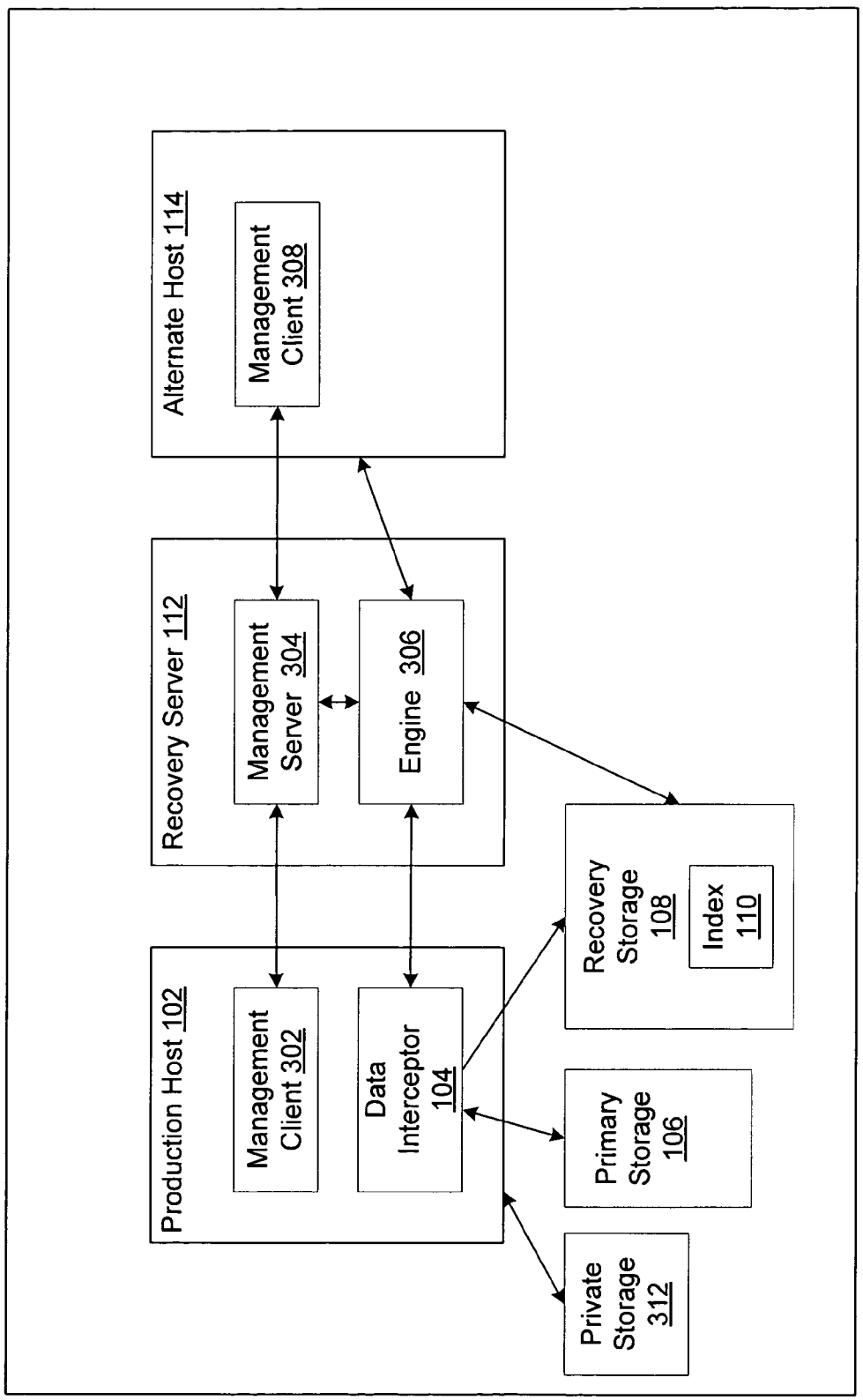
FIG. 3 illustrates an exemplary schematic diagram for management and storage communications in accordance with one embodiment.

The recovery server 112 uses the envelopes to create a recovery index (discussed infra in association with FIG. 3). The recovery server 112 then copies the recovery index to the recovery storage 108 as an index 110. The index 110 maps the envelopes to the data block copies in the recovery storage 108. Specifically, the index 110 maps unique identifiers, such as addresses or sequence numbers, to the data block copies using the information included in the envelopes. In alternative embodiments, the index 110 may be stored in other storage mediums or memory devices coupled to the recovery storage 108 or any other device.

In exemplary embodiments, the data interceptor 104 forwards the data block copies and the envelope(s) to the recovery storage 108. The recovery storage 108 may include the index 110, or the index 110 may otherwise be coupled to the recovery storage 108. More than one recovery storage 108 and/or indexes 110 may be utilized to store the data block copies and the envelope(s) for one or more production hosts 102 according to various embodiments. Further, the recovery storage 108 may comprise random access memory (RAM), hard drive memory, a combination of static and dynamic memories, direct access storage devices (DASD), or any other memory. The recovery storage 108 and/or the index 110 may comprise storage area network (SAN)-attached storage, a network-attached storage (NAS) system, or any other system or network.

The unique identifiers, discussed herein, may be utilized to locate each of the data block copies in the recovery storage 108 from the index 110. As discussed herein, the index 110 maps the envelopes to the data block copies according to the information included in the envelopes, such as the unique identifier, the physical address of the data block copies in the recovery storage 108, and/or the LBA of the data blocks in the primary storage 106 that correspond to the data block copies in the recovery storage 108. Accordingly, the recovery server 112 can utilize a sort function in coordination with the unique identifier, such as a physical address sort function, an LBA sort function, or any other sort function to locate the data block copies in the recovery storage 108 from the map provided in the index 110.

The recovery server 112 is also coupled to the recovery storage 108 and the index 110. In an alternative embodiment, the recovery server 112 may instruct the data interceptor 104 on how to create the index 110 utilizing the envelopes. The recovery server 112 may communicate any other instructions to the data interceptor 104 related to the data blocks, the data block copies, the envelope(s), or any other matters. Further, the recovery server 112 may be coupled to more than one recovery storage 108 and/or indexes 110.

As discussed herein, the index 110 may be utilized to locate the data block copies in the recovery storage 108 and/or the data blocks in the primary storage 106. Any type of information may be included in the envelope(s), such as a timestamp, a logical unit number (LUN), a logical block address (LBA), access and use of data being written for the data block, a storage media, an event marker associated with the data block, a sequence number associated with the data block, an identifier for a group of data block copies stemming from a historical view of the data, and so on.

In one embodiment, the envelopes are indexed according to the metadata in the envelopes, which may be utilized as keys. For example, a logical address index may map logical addresses found on the primary storage 106 to the data block copies in the recovery storage 108. A physical address index may map each physical data block copy address in the recovery storage 108 to the logical address of the data block on the primary storage 106. Additional indexing based on other payload information in the envelopes, such as snapshot identifiers, sequence numbers, and so on are also within the scope of various embodiments. One or more indexes 110 may be provided for mapping and organizing the data block copies.

One or more alternate hosts 114 may access the recovery server 112. In exemplary embodiments, the alternate hosts 114 may request data as it existed at a specific point in time or the recovery point (i.e. the historical view of the data) on the primary storage 106. In other words, the alternate host 114 may request, from the recovery server 112, data block copies that reveal the state of the data as it existed at the recovery point (i.e., prior to changes or overwrites to the data by further data blocks and data block copies subsequent to the recovery point). The recovery server 112 can provide the historical view of the data as one or more snapshots to the alternate hosts 114, as discussed herein.

The alternate hosts 114, or any other device requesting and receiving restored data, can utilize the historical view to generate new data. The new data can be saved and stored to the recovery storage 108 and/or referenced in the index 110. The new data may be designated by users at the alternate hosts 114 as data that should be saved to the recovery storage 108 for access by other users. The recovery server 112 may create envelopes to associate with the new data and store the envelopes in the index 110 in order to organize and map the new data in relation to the other data block copies already referenced in the index 110. Accordingly, the alternate hosts 114 or other device can create various new data utilizing the historical views as the basis for the various new data.

Each of the alternate hosts 114 may include one or more data interceptors 104 according to alternate embodiments. In another embodiment, a single data interceptor 104 may be coupled to one or more of the alternate hosts 114. In yet a further embodiment, the data interceptor 104 functions may be provided by the recovery server 112.

An interface may be provided for receiving requests from the alternate host 114. For instance, a user at the alternate host 114 may select a recovery point for the data from a drop down menu, a text box, and so forth. In one embodiment, the recovery server 112 recommends data at a point in time that the recovery server 112 determines is ideal given parameters entered by a user at the alternate host 114. However, any server or other device may recommend recovery points to the alternate host 114 or any other device. Predetermined parameters may also be utilized for requesting recovered data and/or suggesting optimized recovery points. Any type of variables may be considered by the recovery server 112 in providing a recommendation to the alternate host 114 related to data recovery.

The production host 102 may produce event marker to associate with the data blocks and/or the data block copies. For example, the data interceptor 104 may associate an end of a third quarter with data block copies indicating that the data block copies occurred during or around the end of the third quarter. In one embodiment, a request for a historical view constitutes an event and the event marker may be associated with the one or more data block copies comprising the historical view for later reference. For example, the historical view may be retrieved at a future time by referring to the event marker that indicates the last time the same historical view was requested.

The event markers may be associated with a clock associated with the primary storage 106, the recovery storage 108, or any other storage medium. Accordingly, the clock may assign a time to the storage medium as each copy of the data blocks are stored or in between storage of the data blocks.

Alternatively, the production host 102, the data interceptor 104, the recovery server 112, or any other device may assign one or more points in time to the copies of the data blocks themselves or the one or more points in time may comprise an event marker that identifies events that occur when the data block copies are not being stored to the storage medium. As discussed herein, event markers may comprise one or more points in time that do not coincide with the generation and/or storage of the one or more data block copies. In other words, the event markers may be associated with one or more points in time between the generation and/or storage of the one or more data block copies.

Thus, the event makers may simply indicate a state of the data in the primary storage 106 at the time a particular event associated with the event marker occurred. In other words, no data blocks may have been written and/or stored to the primary storage 106 when the particular event occurred.

In another embodiment, the events may be imported or provided by an entity or resource other than the production host 102 to associate with the event markers. Any source may provide events to associate with the event markers for the data blocks and/or the data block copies. The association of the event markers with the data blocks and/or the data block copies may be implicit or indirect. In other words, the event marker may be associated with a state of the data at a point in time, as discussed herein. A branching data structure and searching may be utilized to establish an actual state of the data corresponding with the point in time. For instance, a major news event may be associated with the data block copies for simple reference back to a noteworthy date, time, and so forth. The event markers may be associated with the data block copies as the data block copies are created by the data interceptor 104 or at any time after the data block copies have been created. Any type of event marker may be associated with the data.

A sequence number of each of the data block copies may be associated with the event marker. Accordingly, one or more data block copies associated with an event marker may be located according to the sequence number.

A text string may be provided for describing an event for the event marker. As discussed herein, any type of information may constitute an event. For example, a text string with an author's name may be included so that the data block copies may later be retrieved by searching for historical views comprised of data block copies associated with the author's name. In one embodiment, the author's name, or other text string, may be associated with an event marker, which is then associated with the data block copies. Accordingly, the author's name may not be directly associated with the data block copies. Similarly, a sequence number or any other unique identifier, as discussed herein, may be associated with the data block copy having the particular event marker associated with the data block copy. The unique identifier may then be utilized to locate the data block copy in the recovery storage 108 via the index 110. The data block copies required to reconstruct a historical view of data requested by a user may then be provided to the user, based on one or more events described by the user.

In exemplary embodiments, one or more event marker are utilized in combination with one or more timestamps in order to locate historical views that correlate with the one or more event markers. For example, if corruption to data occurred approximately ten minutes preceding a particular event from an event marker, or at any other time related to the event, the data can be recovered using the event and the data as it existed 10 minutes prior to the event. Any type of integration, combination, cross-reference, relationship, and so forth between the event markers and the timestamps or any other information may be utilized to locate or recreate the data. In another embodiment, a user can request all the data that occurred between one or more event markers.

The user may select an event or enter an event associated with the historical view desired in order to help the recovery server 112 locate the appropriate data block copies corresponding to the event marker in the recovery storage 108. The recovery server 112 can match the event information from the user with the event marker associated with the historical view. The event information from the user may directly match the event marker associated with the historical view or the recovery server 112 may determine what event marker best matches the event information from the user.

In some embodiments, the event information from the user can be matched with data outside of the recovery server 112. For example, a computing device that coordinates the activities of more than one recovery server 112 may receive the event information from the user and provide instructions to the recovery servers 112 for locating the event markers indicating the historical views that correlate with the event information or forward the request from the user to the recovery servers 112 or an appropriate recovery server 112.

Figure 2:
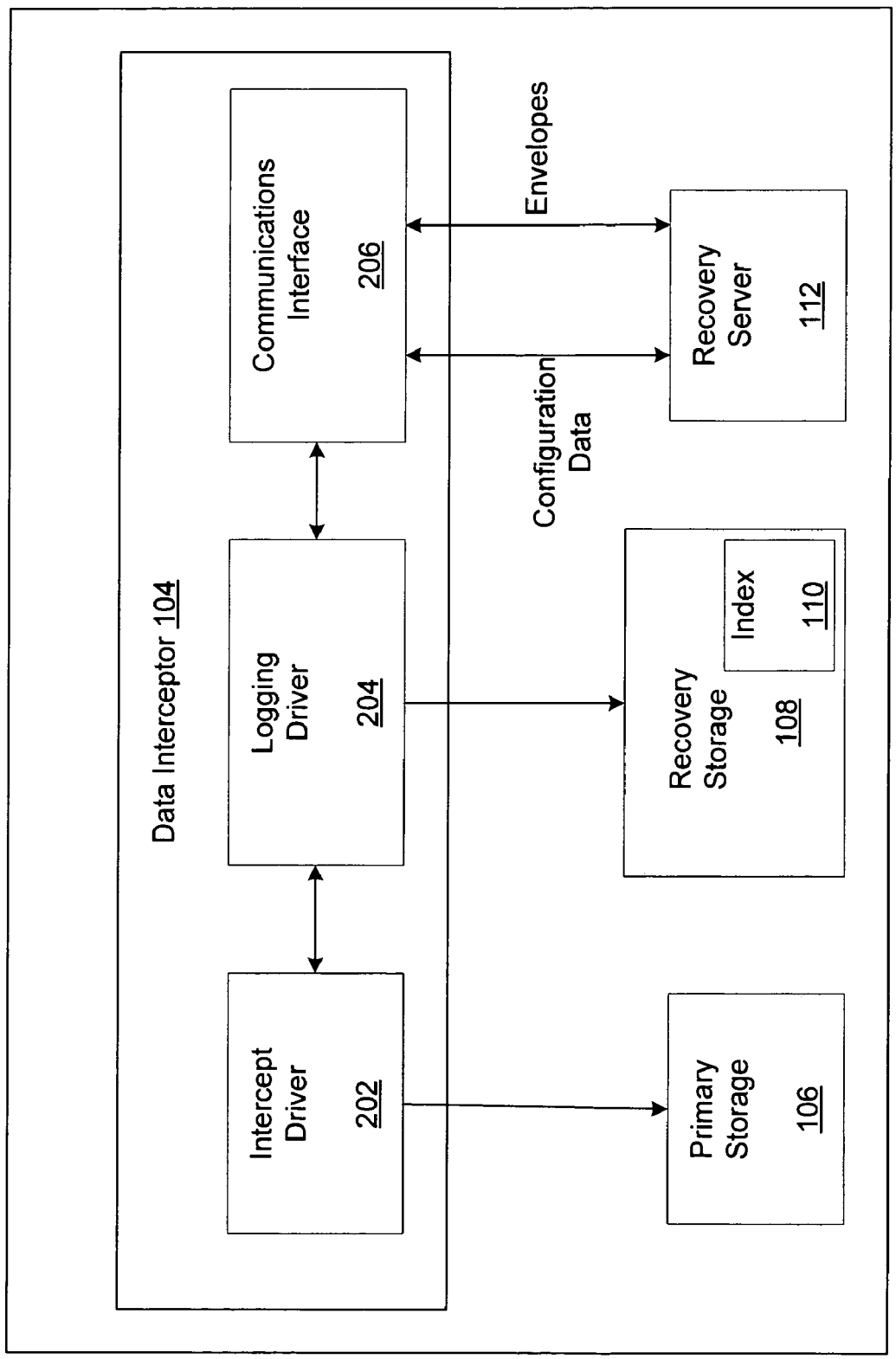
FIG. 2 shows an exemplary schematic diagram for data interceptor coordination of data.

Turning now to FIG. 2, an exemplary schematic diagram for data interceptor coordination of data block copies is shown. The data interceptor 104 may interact, for example, with the primary storage 106, the recovery storage 108, and/or the recovery server 112. The data interceptor 104 includes an intercept driver 202 in communication with a logging driver 204, which is in communication with a communications interface 206. A source initiating creation of the event markers may communicate with the data interceptor 104 in order to note the event markers in the envelopes. In some embodiments, the event markers may be created without coordination with the data interceptor 104.

The intercept driver 202 intercepts the data being generated by the production host 102. The intercept driver 202 then creates a data block from the data generated and a copy of the data block. In other words, the intercept driver 202 captures a data block copy each time a data block is created by the production host 102. The intercept driver 202 stores the data block to the primary storage 106 and forwards the data block copy to the logging driver 204. The data block copies may be generated every time a change to the data already stored in the primary storage 106 occurs.

The logging driver 204, which is coupled to, or otherwise in communication with, the intercept driver 202, generates the one or more envelopes with the metadata discussed herein. As also discussed herein, the metadata may include any type of information associated with the data blocks, such as a time generated, the sequence number, the location of the data blocks in the primary storage 106 and/or the data block copies in the recovery storage 108, the unique identifiers, the one or more event markers associated with the data block copies, and so on.

The logging driver 204 stores the data block copies to the recovery storage 108 along with the metadata. The logging driver 204 also sends the metadata to the recovery server 112 via the communications interface 206. The metadata sent to the recovery server 112 may be identical to the metadata stored to the recovery storage 108 or different. The recovery storage 108 is utilized for storage of the data block copies according to instructions from the recovery server 112 regarding where in the recovery storage 108 to store the data block copies, as discussed herein. Further, the envelopes are also stored in the recovery storage 108. As discussed herein, in an alternative embodiment, the data interceptor 104 may copy the data blocks from the primary storage 106 after the data interceptor 104 or the production host 102 stores the data blocks to the primary storage 106.

In one embodiment, the primary storage 106 and the recovery storage 108 may comprise one storage medium. For example, the recovery storage 108 may be utilized for storing the data blocks using a map of the data blocks, such as the branching data structure used by the recovery server 112. The map may be updated to reflect new data blocks being stored to the recovery storage 108 in such an embodiment.

In this embodiment, the production host 102 may be coupled to the recovery server 108, which in turn is coupled to a storage medium, such as the recovery storage 108. The recovery server 112 may include rules for implementing the branching data structure and a structure for the index 110. The recovery server 112 may use the index 110 and the LBA to determine the physical location of the data blocks in the recovery storage 108. The data block may then be provided to the production host 102 in response to any request(s) from the production host 102, such as a request for a historical view. When the production host 102 generates a data block and specifies an LBA, the recovery server 112 can allocate a free physical block in the recovery storage 108 for the data block. The recovery server 112 then updates the index 110 to map the LBA to the allocated free physical block and stores the data block generated into the allocated free physical block in the recovery storage 108.

Further, a data interceptor 104 may not be provided in accordance with such an embodiment. Instead, the recovery server 112 may perform the data interceptor 104 functions in this embodiment. The recovery server 112 may provide a historical view and store data blocks generated from the production host 102 utilizing the historical view, as discussed herein.

A communications interface 206 is coupled to, or is otherwise in communication with, the logging driver 204 and/or the recovery server 112. The communications interface 206 forwards the instructions from the recovery server 112, discussed herein, to the logging driver 204 indicating where the data block copies and/or the envelopes should be stored in the recovery storage 108. The recovery server 112 uses the envelopes to construct and maintain a recovery index within the recovery server 112 (discussed in association with FIG. 4). The recovery index is then copied as the index 110 in the recovery storage 108.

Specifically, the recovery server 112 sends configuration data to the logging driver 204 via the communications interface 206. The configuration data may include information regarding the area of the recovery storage 108 where the logging driver 204 may store the data block copies, or any other type of information. Any type of configuration data may be communicated to the logging driver 204 for storing the data block copies and/or the envelopes in the recovery storage 108 and/or for organizing the information from the envelopes in the index 110.

Although the data interceptor 104 is described as including various components, the data interceptor 104 may include more components or fewer components than those listed and still fall within the scope of various embodiments.

FIG. 3 illustrates an exemplary schematic diagram for management and storage communications in accordance with one embodiment. The exemplary production host 102 includes a management client 302, as well as the data interceptor 104 discussed herein. The exemplary recovery server 112 includes a management server 304 and an engine 306. Further, the alternate host 114 also includes a management client 308. As discussed herein, in some embodiments, the one or more alternate hosts 114 may also include data interceptors 104 for copying the data blocks generated while utilizing historical views of the data.

The management server 304 may be remotely connected to the recovery server 112 according to various embodiments. For example, if a plurality of recovery servers 112 are provided, each of the recovery servers 112 may be coupled to each of a plurality of management servers 304, for a one to one relationship. Alternatively, two or more recovery servers 112 of a plurality of recovery servers 112 may share one management server 304 amongst a plurality of management servers 304. Any number of recovery servers 112 may be coupled to any number of management servers 304 according to exemplary embodiments.

In further embodiments, each recovery server 112 may include a management server 304 that further communicates with the management clients 308. The management clients 308 may be coupled to any device, such as protected servers, alternate hosts 114, and so forth.

In one embodiment, the management server 304 is coupled to the recovery server 112, rather than residing in the recovery server 112. A management client residing on the recovery server 112 may then communicate with the management server 304 and other management clients in a system comprised of more than one recovery server 112, as discussed herein.

In one embodiment, a user may select an event marker corresponding with a historical view or to which recovery should be performed. The management server 304 can process the event marker and determine which historical view(s) corresponds with the event marker selected by the user. The historical view may then be provided to the user based on the event marker. As discussed herein, the user may select the event marker, provide key words or text strings associated with an event marker, provide unique identifiers related to the event marker, and so on. The management server 304 may match the event information entered by the user with the event markers in order to determine which event marker best matches the event information.

The management client 302 of the production host 102 is in communication with the management server 304 of the recovery server 112 for coordinating and managing activities within the SAN. The data interceptor 104 stores the data blocks to the primary storage 106. The data interceptor 104 communicates with the recovery server 112 in order to store the data block copies to the recovery storage 108. If the production host 102 is down, the engine 306 at the recovery server 112 can recover data block copies from the recovery storage 108 in order to provide a historical view to the alternate host 114 as requested by a user associated with the alternate host 114. The historical view may be requested by a system or a process according to some embodiments. For example, an automated process may request historical views of the data for performing offline backup.

The engine 306 coordinates activities of the data interceptor 104 via communication with the data interceptor 104. In one embodiment, the engine 306 coordinates the activities of more than one data interceptor 104. As discussed herein, the activities that may be coordinated by the engine 306 include instructing the data interceptor 104 where and/or how to store the data block copies and the envelopes in the recovery storage 108 and/or the envelopes in the index 110. However, any types of activities may be coordinated by the engine 306.

As discussed herein, the data interceptor 104 may use private storage 310, as shown in FIG. 3 for storage of metadata, envelopes, and/or data block copies. The private storage 310 is coupled to the production host 102. However, in some embodiments, the private storage 310 may be coupled to the primary storage 106 or may comprise a portion of the primary storage 106. Accordingly, as discussed herein, if the recovery storage 108 is not accessible, the data interceptor 104 can store the data block copies, a bit map, or other bookkeeping information to the private storage 310. The data block copies can then be provided to the recovery storage 108 when the recovery storage 108 becomes accessible. However, according to one embodiment, the private storage 310 may be utilized for storing any information, regardless of whether the recovery storage 108 is accessible.

Furthermore, the engine 306 of the recovery server 112 can simultaneously access the recovery storage 108 while the data interceptor 104 accesses the recovery storage 108. Accordingly, the engine 306 at the recovery server 112 can retrieve the data block copies from the recovery storage 108 as other data block copies are being stored to the recovery storage 108 by the data interceptor 104. For example, the engine 306 can process requests for historical views from the alternate host 114 performing recovery operations while the engine 306 continues to process and/or provide instructions for incoming data block copies and envelopes from the production host 102.

The alternate host 114 may also include a management client 308. The management server 304 of the recovery server 112 may communicate directly with the management client 308 at the alternate host 114 to deliver historical views of the data requested by a user at the alternate host 114 back to the alternate host 114.

The engine 306 at the recovery server 112 can also communicate with the alternate host 114. The engine 306 may deliver the data requested by the alternate host 114 directly to the alternate host 114. For example, a user may select an event marker representing a historical view and the engine 306 can locate the data block copies to create the historical view requested and return the historical view to the user at the alternate host 114.

Figure 4:
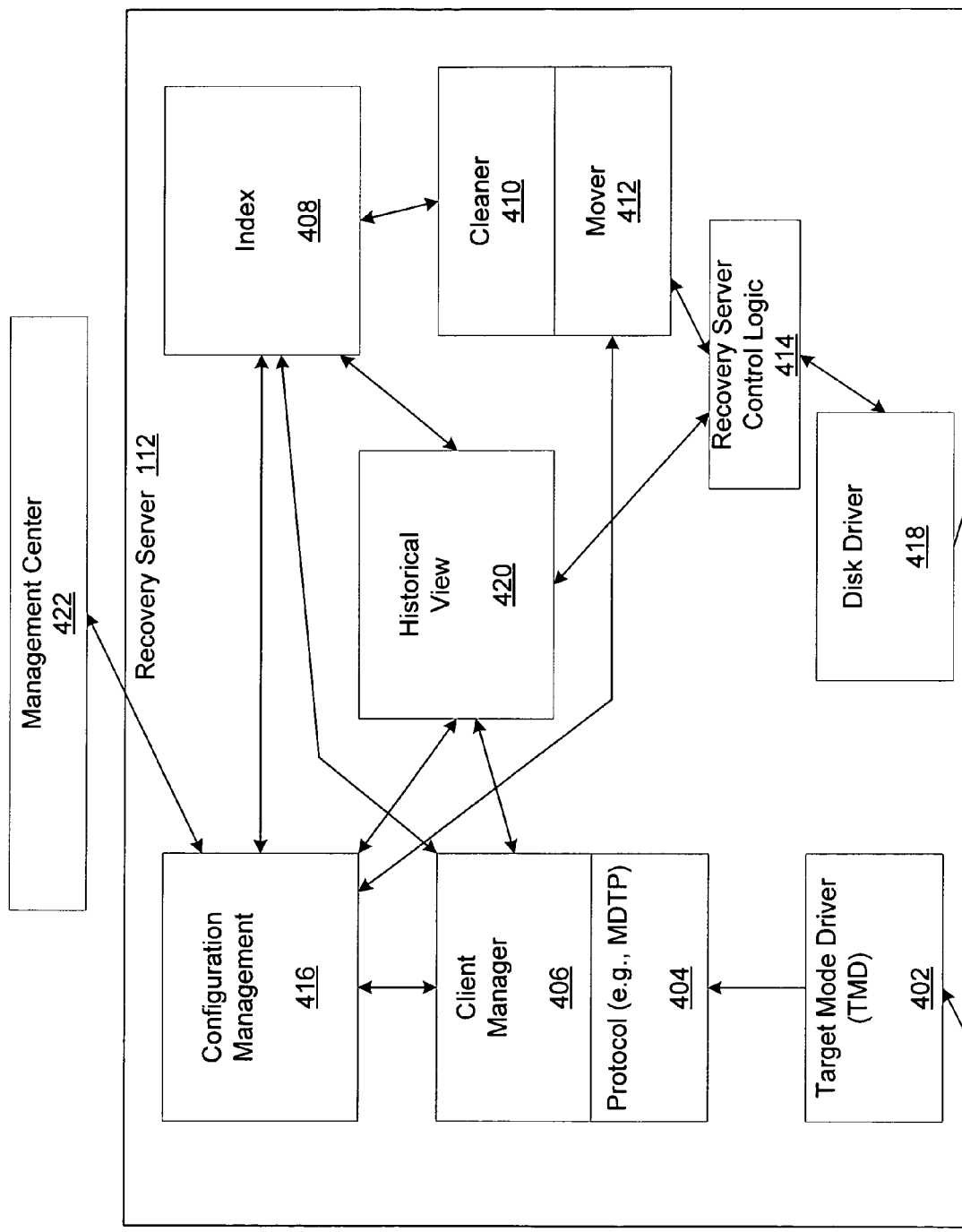
FIG. 4 shows an exemplary schematic diagram for recovery server activity in accordance with one embodiment.

FIG. 4 shows an exemplary schematic diagram for recovery server 112 coordination of historical views. One or more envelopes arrive at the recovery server 112 via a target mode driver (TMD) 402. The TMD 402 responds to commands for forwarding the envelopes. Alternatively, any type of driver may be utilized for communicating the envelopes to the recovery server 112.

The envelopes may be forwarded by the data interceptor 104 utilizing a proprietary protocol 404, such as the Mendocino Data interceptor Protocol (MDTP). A client manager 406 may be provided for coordinating the activities of the recovery server 112. The envelopes are utilized by the recovery server 112 to construct a recovery index 408. The recovery index 408 is then copied to the index 110 (FIG. 1) associated with the recovery storage 108 (FIG. 1). In order to update the index 110, the recovery index 408 may be updated and copied each time new envelopes arrive at the recovery server 112 or the recovery server 112 may update the index 110 with the new envelope information at any other time.

Optionally, a cleaner 410 defragments the data block copies and any other data that is stored in the recovery storage 108. As another option, a mover 412 moves the data block copies (i.e. the snapshots) in the recovery storage 108 and can participate in moving the data block copies between the recovery storage 108, the production host 102, the alternate hosts 114 (FIG. 1), and/or any other devices.

A recovery storage control logic 414 manages storage of the envelopes and the data block copies in the recovery storage 108 using configuration information generated by a configuration management component 416. A disk driver 418 then stores (e.g., writes) the envelopes and the data block copies to the recovery storage 108.

When a user requests a historical view of the data, as discussed herein, a historical view component 420 retrieves the data block copies needed to provide the historical view requested by a user. The user may request the historical view based on an event marker or any other criteria. Specifically, the historical view component 420 references the recovery index 408 or the index 110 pointing to the data block copies in the recovery storage 108. The historical view component 420 then requests the data block copies, corresponding to the envelopes in the index 110, from the recovery storage control logic 414. The disk driver 418 reads the data block copies from the recovery storage 108 and provides the data block copies to the historical view component 420. The data block copies are then provided to the user at the alternate host 114 that requested the data.

As discussed herein, according to one embodiment, the historical view may be constructed utilizing the data block copies from the recovery storage 108 and the data blocks from the primary storage 106. Thus, the data block copies may be utilized to construct a portion of the historical view while the data blocks may be utilized to construct a remaining portion of the historical view.

The user of the historical view may utilize the historical view to generate additional data blocks, as discussed herein.

Copies of the data blocks may then be stored in the recovery storage 108 along with corresponding envelopes. The recovery server 112 then updates the index 110 and/or the branching data structure to include references to the new data block copies. Accordingly, the new data block copies are tracked via the index 110 in relation to other data block copies already stored in the recovery storage 108. One or more event markers may be associated with the new data block copies, as the copies are generated or at any other time. As discussed herein, the event markers may be directly associated with the new data block copies, or they event markers may be indirectly associated with the new data block copies. According to some embodiments, generating the new data block copies constitutes an event to associate with an event marker, itself.

By creating the branching data structure to reference the index 110, modifications to the data are stored along with the original data upon which those modifications are based. Modifications can continue to be stored as the modifications relate to the data upon which the modifications are based, so that a hierarchical relationship is organized and mapped. By using the branching data structure, the various data block copies relationship to one another can be organized at a higher level than the index 110. The branching data structure and the index 110 may comprise a single structure according to some embodiments. According to further embodiments, the branching data structure, the index 110, and/or the data block copies may comprise a single structure.

The branches in the branching data structure may be created when the historical views are modified, or when data blocks from the primary storage 106 are removed or rolled back to a point in time (i.e. historical view). The event markers may be inserted on the branches after the branches are generated. The data interceptor 104 functionality, as discussed herein, may be provided by any components or devices. Branching tree structures and the process of generating event markers is described in further detail in co-pending U.S. application Ser. No. 11/166,690, entitled "Systems and Methods for Organizing and Mapping Data," filed on Jun. 23, 2005.

In some embodiments, a historical view component, such as the historical view component 420 discussed herein, residing at the recovery server 112 may provide historical views to an alternate server, such as the alternate host 114 discussed herein or any other device. The alternate server may then utilize the historical view to generate additional data blocks. For example, the alternate server may write data on top of the historical view. The additional data blocks may be generated by the alternate server using the historical view component at the recovery server 112. The historical view component may then generate envelopes and store the envelopes and the data blocks in the recovery server 112, as well as update the index 110 accordingly. Thus, the historical view component in some embodiments provides functions similar to the functions that may be provided by the data interceptor 104. In other embodiments, the historical view component resides outside of the recovery server 112, but is coupled to the recovery server 112 and the recovery storage 108 in order to provide functionalities similar to the data interceptor 104. Further, the production host 102 and the alternate server may comprise a single device according to some embodiments. As discussed herein, the primary storage 106 and the recovery storage 108 may comprise one storage medium according to some embodiments. Historical views are further described within co-pending U.S. application Ser. No. 11/216,874, entitled "Systems and Methods for Rapid Presentation of Historical Views of Stored Data," filed on Aug. 30, 2005.

In other embodiments, the production host 102 includes a historical view component and a data interceptor 104, both residing on the production host 102. However, the historical view component and/or the data interceptor 104 may reside outside of, but be coupled to, the production host 102 in other embodiments. Further, the historical view component and the data interceptor 104 may comprise one component in some embodiments. The generation of envelopes, data blocks, data block copies, indexes, and so forth may be performed by the historical view component and/or the data interceptor 104 at the production host 102 in such an embodiment.

As discussed herein, the historical view component may request data blocks from the primary storage 106 and/or data block copies from the recovery storage 108 in order to generate the historical view. Further, the additional data blocks generated utilizing the historical view (i.e. on top of the historical view) may be stored to either the primary storage 106, the recovery storage 108, or to both the primary storage 106 and the recovery storage 108. The primary storage and the recovery storage may be combined into one unified storage in some embodiments.

A management center 422 may also be provided for coordinating the activities of one or more recovery servers 112, according to one embodiment.

Although FIG. 4 shows the recovery server 112 having various components, the recovery server 112 may include more components or fewer components than those listed and still fall within the scope of various embodiments.

Figure 5:
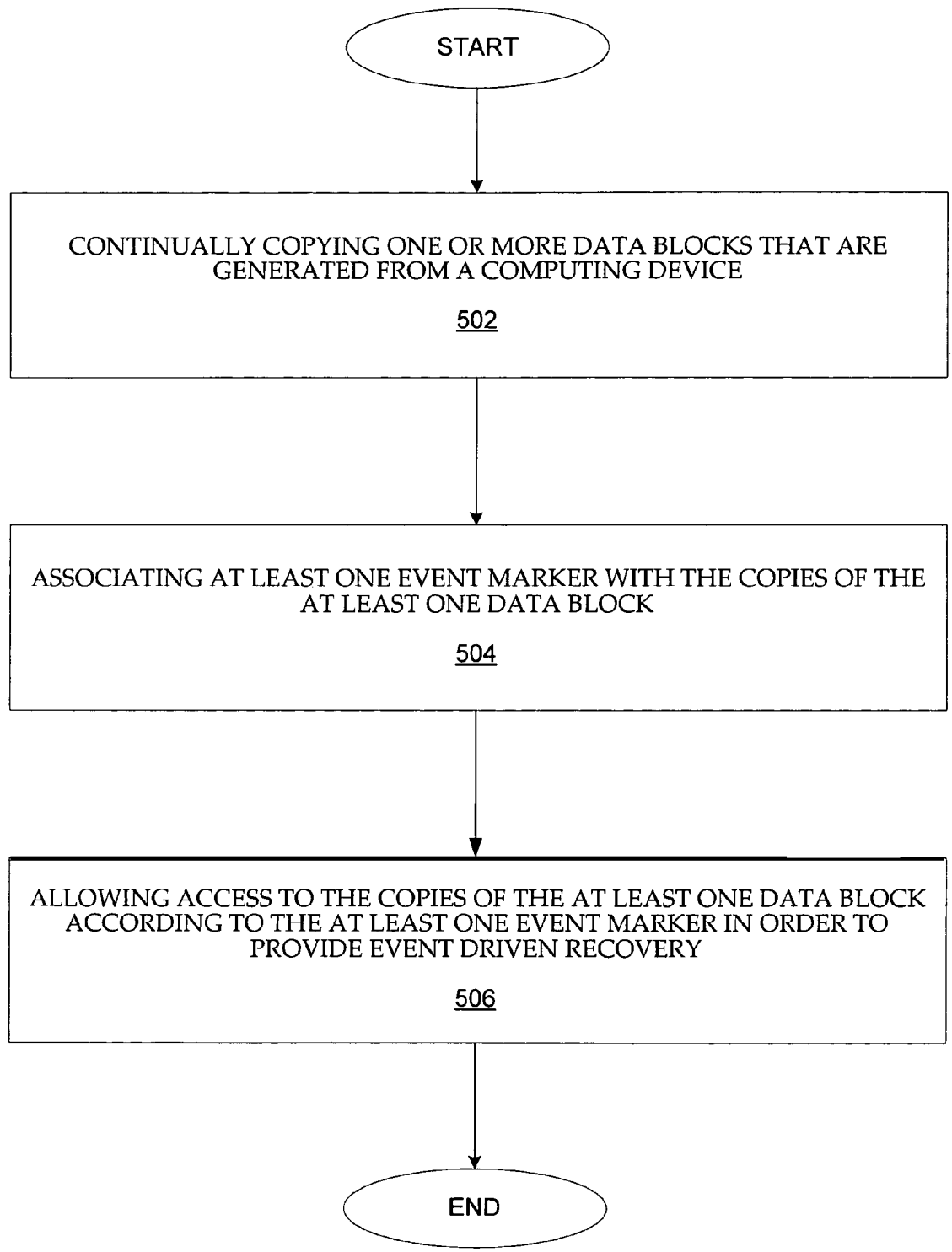
FIG. 5 shows an exemplary flow diagram for providing event driven recovery management in accordance with one embodiment.

Referring now to FIG. 5, an exemplary flow diagram for providing event driven recovery management in accordance with an exemplary embodiment is shown. At step 502, one or more data blocks that are generated from a computing device are continually copied. As discussed herein, the production host 102 or any other device may create one or more data blocks, which are then continually copied by the data interceptor 104 to the primary storage 106 and to the recovery storage 108 as a data block copy. As discussed herein, the primary storage 106 and the recovery storage 108 may comprise one storage medium according to some embodiments.

The data blocks may be copied continually after or as they are generated or intermittently according to some embodiments. In exemplary embodiments, the data blocks may be copied continually, followed by periods of intermittent copying, and so on. Any combination of continuous copying and intermittent copying may occur. In some embodiments, the data blocks are copied after a certain number of data blocks are generated. Any type of time intervals, continuous, consecutive, intermittent, or any combination thereof related to copying the data blocks may be provided according to various embodiments.

As discussed herein, the one or more data blocks may be created by modifying existing data block copies. Further, the existing data block copies comprising a historical view may be provided by a historical view component, which may also perform functions similar to the data interceptor 104 according to some embodiments. Accordingly, the data blocks generated may be copied by another device or component according to some embodiments.

As discussed herein, the alternate hosts 114 or any other devices can utilize the copies of the one or more data blocks comprising various historical views to create new data blocks. The new data blocks created utilizing the copies of the one or more data blocks may also be copied. Accordingly, users can continue to use historical views of data based on the copies of the one or more data blocks and the copies of the one or more new data blocks to generate more new data.

At step 504, at least one event marker is associated with the copies of the one or more data blocks. The data interceptor 104 discussed in FIG. 1, or any other device or component, may associate the at least one event marker with the data block copies. The event marker(s) may comprise any type of information. As discussed herein, the event(s) for the event markers may be provided by any source. The event markers may be associated with the data block copies when the data block copies are generated or at any other time.

Further, one or more points in time may be associated with the data block copies directly or indirectly. In other words, the one or more points in time may correspond to the generation and/or storage of the data block copies and/or the one or more points in time may correspond with at least one time in between the generation and/or storage of the data block copies, or distinct from the generation and/or storage of the data block copies. For example, the one or more points in time may correspond to a state of data at a point in time or a state of a storage medium, such as the recovery storage 108 (FIG. 1), at a point in time.

Any point in time, such as a point in time marked by a timestamp, may be associated with the event markers. Further, any other information, related to time or unrelated to time, may be associated with the event markers, which may be associated with the data block copies, the storage medium, a state of data, a clock associated with the storage medium, and so forth. In exemplary embodiments, sequence numbers may be associated with the event markers. In some embodiments, a timestamp and a sequence number may both be associated with the data block copies.

At step 508, access to the copies of the one or more data blocks according to the at least one event marker is allowed in order to provide event driven recovery. The index 110 may be utilized for searching for the one or more data block copies in the recovery storage 108, or any other storage. Accordingly, the data block copies may later be accessed from the storage medium by a user that enters information about the event. As discussed herein, the event markers may be generated by the production host 102 or any other source, such as a source unaffiliated with the event driven recovery management environment. The event markers may be associated with a timestamp, a sequence number, or any other data. The timestamp, the sequence number, or any other information may be referenced in the index 110 to locate the historical view that corresponds to the event marker. In other words, the event marker is associated with a timestamp and/or a sequence number according to exemplary embodiments.

The data blocks may also be accessed from the primary storage 106. As discussed herein, the recovery storage 108 and/or the index 110 may include information related to the location of the data blocks in the primary storage 106.

The data interceptor 104, or any other device, may associate a time and/or a sequence number with the data. Accordingly, the envelopes associated with the data block copies may include an event, a time, a sequence number, and so on. Any information may be included in the envelopes, as discussed herein.

While various embodiments have been described above, it should be understood that they have been presented by way of example only, and not limitation. For example, any of the elements associated with event driven recovery management may employ any of the desired functionality set forth hereinabove. Thus, the breadth and scope of a preferred embodiment should not be limited by any of the above-described exemplary embodiments.

What is claimed is:

1. A method for providing event driven recovery management comprising:
   continually intercepting and copying one or more data blocks that are generated from a computing device;
   associating at least one event marker with the copies of the one or more data blocks, wherein the at least one event marker is associated with an event that occurs independent of the copies of the one or more data blocks; and
   allowing access to the copies of the one or more data blocks according to the at least one event marker in order to provide event driven recovery.

2. The method recited in claim 1, wherein the at least one event marker is generated by the computing device.

3. The method recited in claim 1, wherein the at least one event marker is generated by a source other than the computing device.

4. The method recited in claim 1, wherein the at least one event marker is associated with a timestamp associated with the copies of the one or more data blocks.

5. The method recited in claim 1, wherein the at least one event marker is associated with a timestamp distinct from a timestamp associated with the copies of the one or more data blocks.

6. The method recited in claim 1, wherein the at least one event marker is associated with a sequence number associated with the copies of the one or more data blocks.

7. The method recited in claim 1, wherein the at least one event marker is associated with a sequence number distinct from a sequence number associated with the copies of the one or more data blocks.

8. The method recited in claim 1, further comprising storing the copies of the one or more data blocks in a storage medium.

9. The method recited in claim 8, wherein the at least one event marker is associated with the copies of the one or more data blocks after the copies of the one or more data blocks are stored in the storage medium.

10. The method recited in claim 8, further comprising associating a timestamp that coincides with a clock associated with a recovery server that determines where the copies of the one or more data blocks are stored in the storage medium.

11. The method recited in claim 1, wherein the data blocks comprise data of various sizes.

12. A system for providing event driven recovery management comprising:
   a data interceptor configured to continually intercept and copy one or more data blocks that are generated;
   a first computing device configured to generate the one or more data blocks and to associate at least one event marker with the copies of the one or more data blocks, wherein the at least one event marker is associated with an event that occurs independent of the copies of the one or more data blocks; and
   a second computing device configured to allow access to the copies of the one or more data blocks intercepted by the data interceptor according to the at least one event marker in order to provide event driven recovery.

13. The system recited in claim 12, wherein the at least one event marker is generated by the first computing device.

14. The system recited in claim 12, wherein the at least one event marker is generated by a source other than the first computing device.

15. The system recited in claim 12, wherein the at least one event marker is associated with a timestamp associated with the copies of the one or more data blocks.

16. The system recited in claim 12, wherein the at least one event marker is associated with a timestamp distinct from a timestamp associated with the copies of the one or more data blocks.

17. The system recited in claim 12, wherein the at least one event marker is associated with a sequence number associated with the copies of the one or more data blocks.

18. The system recited in claim 12, wherein the at least one event marker is associated with a sequence number distinct from a sequence number associated with the copies of the one or more data blocks.

19. The system recited in claim 12, further comprising a storage medium configured to store the copies of the one or more data blocks.

20. The system recited in claim 19, wherein the at least one event marker is associated with the copies of the one or more data blocks after the copies of the one or more data blocks copies are stored in the storage medium.

21. The system recited in claim 12, wherein the second computing device comprises a recovery server.

22. The system recited in claim 21, further comprising a clock associated with the recovery server for associating a timestamp with the at least one event marker.

23. The system recited in claim 21, wherein the first computing device and the second computing device comprise a single computing device.

24. The system recited in claim 12, wherein the data blocks comprise data of various sizes.

25. A computer program embodied on a computer readable medium having instructions for providing event driven recovery management comprising:
   continually intercepting and copying one or more data blocks that are generated from a computing device;
   associating at least one event marker with the copies of the one or more data blocks, wherein the at least one event marker is associated with an event that occurs independent of the copies of the one or more data blocks; and
   allowing access to the copies of the one or more data blocks according to the at least one event marker in order to provide event driven recovery.

26. The computer program recited in claim 25, wherein the at least one event marker is generated by the computing device.

27. The computer program recited in claim 25, wherein the at least one event marker is generated by a source other than the computing device.

28. The computer program recited in claim 25, wherein the at least one event marker is associated with a timestamp associated with the copies of the one or more data blocks.

29. The computer program recited in claim 25, wherein the at least one event marker is associated with a timestamp distinct from a timestamp associated with the copies of the one or more data blocks.

30. The computer program recited in claim 25, wherein the at least one event marker is associated with a sequence number associated with the copies of the one or more data blocks.

31. The computer program recited in claim 25, wherein the at least one event marker is associated with a sequence number distinct from a sequence number associated with the copies of the one or more data blocks.

32. The computer program recited in claim 25, further comprising storing the copies of the one or more data blocks in a storage medium.

33. The computer program recited in claim 32, wherein the at least one event marker is associated with the copies of the one or more data blocks after the copies of the one or more data blocks are stored in the storage medium.

34. The computer program recited in claim 32, further comprising associating a timestamp that coincides with a clock associated with a recovery server that determines where the copies of the one or more data blocks are stored in the storage medium.

35. The computer program recited in claim 25, wherein the data blocks comprise data of various sizes.

* * * * *